(12) United States Patent
Hannan et al.

(10) Patent No.: US 11,007,677 B2
(45) Date of Patent: May 18, 2021

(54) MAGNETICALLY ATTACHED FLANGES

(71) Applicant: TPI Composites, Inc., Warren, RI (US)

(72) Inventors: Jim Hannan, Warren, RI (US); Andrew McDonald, Warren, RI (US)

(73) Assignee: TPI Composites, Inc., Warren, RI (US)

( * ) Notice: Subject to any disclaimer, the term of this patent is extended or adjusted under 35 U.S.C. 154(b) by 76 days.

(21) Appl. No.: 16/058,417

(22) Filed: Aug. 8, 2018

(65) Prior Publication Data

US 2019/0291306 A1   Sep. 26, 2019

Related U.S. Application Data

(60) Provisional application No. 62/646,194, filed on Mar. 21, 2018.

(51) Int. Cl.
| | | |
|---|---|---|
| *B29C 33/20* | (2006.01) | |
| *B29C 70/34* | (2006.01) | |
| *B29L 31/08* | (2006.01) | |
| *B29K 307/04* | (2006.01) | |
| *B29K 309/08* | (2006.01) | |
| *B29C 45/64* | (2006.01) | |

(52) U.S. Cl.
CPC .......... *B29C 33/20* (2013.01); *B29C 70/345* (2013.01); *B29C 2045/645* (2013.01); *B29K 2307/04* (2013.01); *B29K 2309/08* (2013.01); *B29L 2031/085* (2013.01)

(58) Field of Classification Search
CPC ... B29D 99/0025; B29C 70/345; B29C 33/20; B29C 2045/645; B29C 2045/1746
See application file for complete search history.

(56) References Cited

U.S. PATENT DOCUMENTS

| | | | |
|---|---|---|---|
| 3,528,133 A | 9/1970 | Morse | |
| 4,836,765 A | 6/1989 | Kornitzky et al. | |
| 4,837,114 A * | 6/1989 | Hamada | H01F 1/0572 148/302 |
| 6,264,877 B1 * | 7/2001 | Pallu De La Barriere | B29C 70/446 264/258 |
| 8,899,546 B2 | 12/2014 | Mironov | |
| 9,181,923 B2 | 11/2015 | Grabau | |
| 2009/0295013 A1 * | 12/2009 | Luo | B29C 43/006 264/109 |
| 2010/0124659 A1 * | 5/2010 | Nelson | B29C 35/0266 428/411.1 |

(Continued)

OTHER PUBLICATIONS

International Search Report and Written Opinion for International Application No. PCT/US18/45804 dated Oct. 25, 2018.

*Primary Examiner* — Scott W Dodds
(74) *Attorney, Agent, or Firm* — Foley Hoag LLP; Stephen J. Kenny

(57) ABSTRACT

A mold for forming a wind turbine blade comprising first and second mold surfaces including a flange portion having an opening therein, wherein the first and second mold surfaces are configured for relative movement therebetween from an open position to a closed position. The opening of the first flange portion is aligned with the opening of the second flange portion when in the closed position, and a first magnet is disposed within the opening in the opening of the first mold surface, and a second magnet is disposed within the opening of the second mold surface.

11 Claims, 5 Drawing Sheets

(56) References Cited

U.S. PATENT DOCUMENTS

2015/0001768 A1\* 1/2015 Kia ................. B29C 73/30
                                              264/484
2018/0250895 A1\* 9/2018 Wardropper ......... B29C 70/541

\* cited by examiner

MAGNETICALLY ATTACHED FLANGES

CROSS-REFERENCE TO RELATED APPLICATIONS

This application claims the benefit of priority under 35 USC 119 to U.S. Provisional application No. 62/646,194 filed Mar. 21, 2018, the entire contents of which are hereby incorporated by reference.

BACKGROUND OF THE DISCLOSED SUBJECT MATTER

Field of the Disclosed Subject Matter

The disclosed subject matter relates to a system for molding shaped composite materials. Particularly, the present disclosed subject matter is directed towards a mold and corresponding method of manufacturing composite materials including carbon and/or glass fiber, e.g., wind turbine blades.

Description of Related Art

A variety of methods and systems are known for forming and shaping wind turbine blades. Examples of conventional molds and techniques are provided in the following publications, each of which is hereby incorporated by reference in their entirety: U.S. Pat. Nos. 9,463,583, 8,108,982, 8,899,546, 4,105,184, 5,260,014, 5,358,211, 5,437,547, 6,264,877, 6,040,362, 8,202,458, 8,33,7192, 8,877,116; and U.S. Patent Application Publication Numbers 20060027314, 20060249872, 20070102837, 20110221093, 20130113141, 20140333009, 20140345789, 20160158970, 20160185092 and US20160193752.

Such conventional methods and systems generally have been considered satisfactory for their intended purpose. Recently, however, there has been a need for a mold which can include flange portions that do not require threaded couplings, which allows for unwanted leakage of resin material under pressure.

The presently disclosed subject matter provides a new innovative solution for a mold for forming a flange of a composite material, e.g. wind turbine blade, in which removable flange portions include magnets to facilitate coupling to the main flange of the mold.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a mold for forming a wind turbine blade comprising a first and second mold surfaces including a flange portions having openings therein; wherein the first and second mold surfaces are configured for relative movement therebetween from an open position to a closed position; and wherein the opening of the first flange portion is aligned with the opening of the second flange portion when in the closed position. A first magnet disposed within the opening in the opening of the first mold surface; and a second magnet disposed within the opening of the second mold surface.

In some embodiments, the first and second magnets are rare-earth magnets; the first magnet has a width greater than at least half the width of the first flange portion; the second magnet has a width greater than at least half the width of the second flange portion; and/or at least one magnet has a thickness of approximately 3 mm.

In some embodiments, a depth of the opening in the first flange surface extends a distance less than the thickness of the first flange surface, and a depth of the opening in the second flange surface extends a distance less than the thickness of the second flange surface. Additionally, an upper surface of the first magnet can be arranged in-plane with an upper surface of the first flange portion, and an upper surface of the second magnet can be arranged in-plane with an upper surface of the second flange portion.

At least one of the mold surfaces can be removable, with the first flange portion and second flange portion having equivalent width, and at least one lamina of a composite material is disposed between the first flange surface and the second flange surface.

In accordance with another aspect, the present disclosure includes a method of forming a wind turbine blade comprising: providing first and second mold surfaces including a flange portion having an opening therein with at least one magnetic material disposed in the opening; moving at least one of the first and second mold surfaces to align the opening of the first flange portion with the opening in the second flange; and magnetically coupling the first flange portion to the second flange portion.

In some embodiments, the method further comprises providing at least one lamina of a composite material between the first flange surface and the second flange surface.

Additionally, the magnetic coupling can be provided by a rare-earth magnets, wherein a first magnet is disposed within the opening in the opening of the first mold surface, and a second magnet is disposed within the opening in the opening of the second mold surface, with an upper surfaces of the magnets in-plane with the surface of the flange portions. The method can further include removing at least one of the first or second flanges.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for molding shaped composite materials. The disclosed subject matter is particularly suited for manufacturing of composite materials including carbon and/or glass fiber, e.g., wind turbine blades.

Molds employed for manufacturing composite materials contain various contours to shape the composite material, ensure a desired geometry, and simultaneously process the composite materials, in particular for curing the matrix formers contained therein. For example, a fiber material is added to the mold in the area of fiber composite construction, and subsequently impregnated with resin, for example in a vacuum infusion process, and cured through thermal exposure. The manufacturing step involving impregnation can also be facilitated by using pre-impregnated material (prepreg).

In accordance with present disclosure, the blade is formed by use of a mold having two portions a first one of which is designed to be positioned on the second portion. The first mold portion can be pivoted/rotated in a clam-shell fashion into engagement with the second portion, or alternatively can be lowered into engagement via handling means, e.g. crane with supporting straps.

Prior to joining the two mold portions, the two mold portions are in the open position in which the interior walls are exposed (i.e. face upwards) so that one or more layers of a flexible cloth having threads made up of a mixture of threads or fibers of plastics material and of reinforcing threads or fibers, preferably of fiberglass, can be put into place inside each mold portion. Such a cloth can be constituted by threads made up of a mixture of polypropylene fibers or threads and glass fibers or threads, and in the form of a sheet of woven threads and/or in multi-ply form.

In accordance with an aspect of the present disclosure, the system disclosed herein can be employed during a vacuum assisted resin transfer molding. In such processes a liquid polymer, or resin, is filled into a mold cavity in which a fiber material has been previously laid down. A second mold part is brought into position to form a seal with the first mold part in order to define a mold cavity. Next, a vacuum force is applied in the mold cavity to draw the liquid polymer resin into and throughout the fiber material.

Figure 1:
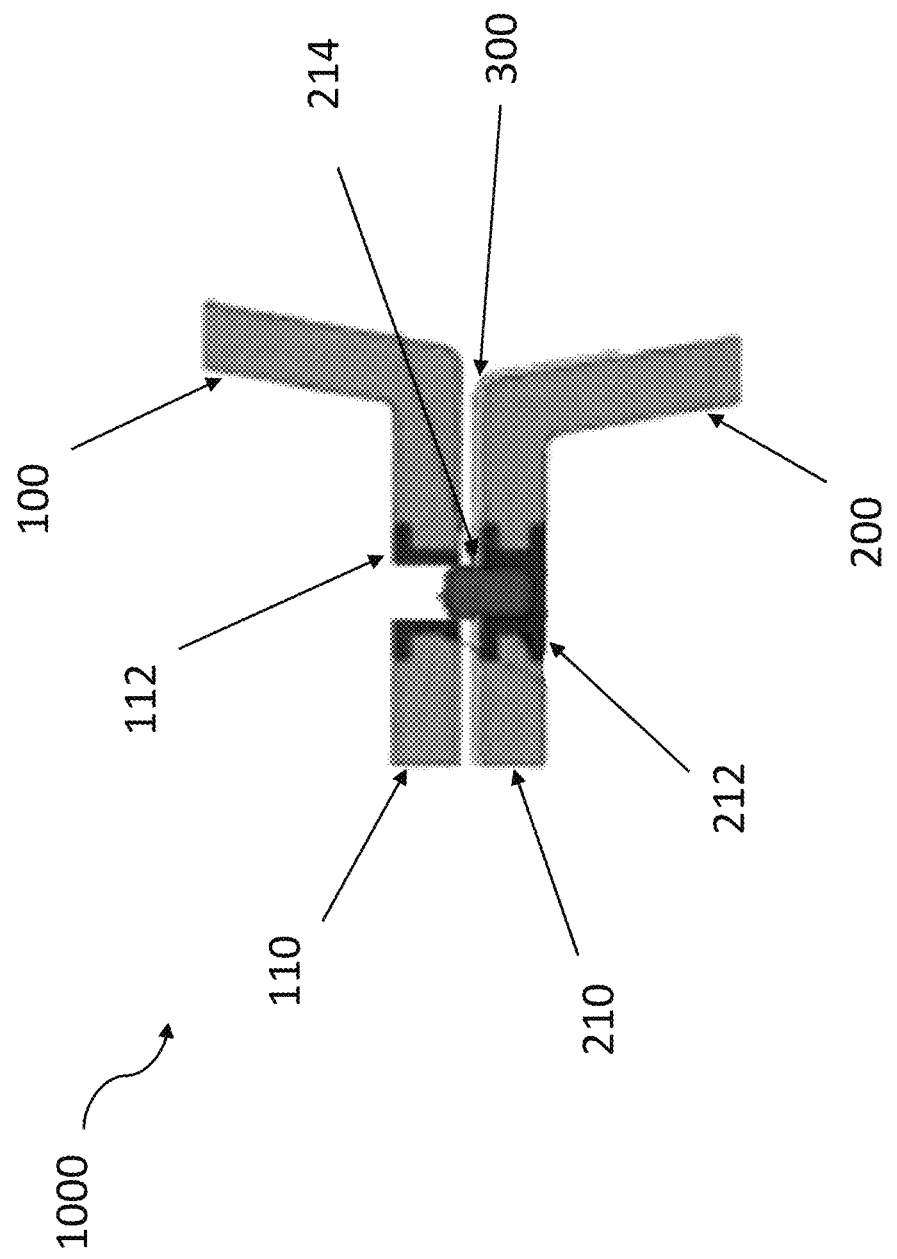
FIG. 1 is a schematic cross-sectional representation of conventional mold for forming flanges of a wind turbine blade.

FIG. 1 depicts an exemplary embodiment of a composite structure mold and is designated generally by reference character 1000. Similar reference numerals (differentiated by the leading numeral) may be provided among the various views and Figures presented herein to denote functionally corresponding, but not necessarily identical structures.

As shown in FIG. 1, the system 1000 generally includes a mold for forming a flange of a wind turbine blade having upper 100 and lower 200 mold halves, each with complimentary portions 110, 210 forming generally L-shaped flanges, as shown. In the exemplary embodiment shown, the flange portions 110, 210 are integrally formed with portions 100, 200 extending generally perpendicularly in the vertical direction from the horizontal base portions 110, 210. For purpose of illustration and not limitation, an exemplary embodiment includes a flange having equally sized (i.e. aspect ratio=1) flange portions 100,110 of approximately 4 inches in width. In other embodiments the flanges 110, 210 can be formed of a first size (e.g. 4 inches) while the vertical portions 100, 200 have a larger size (e.g. 6 inches). It is to be understood that the current disclosure is not limited to any particular dimensions, and that the geometry of the flanges can be adjusted as desired to accommodate any desired blade configuration.

The flanges can include a position indicating mechanism that registers the location of the two flanges with respect to each other. In the embodiment shown in FIG. 1, a locating pin 214 is included within the lower mold flange 210, which can be received by the flange 110 of the upper mold. An insert 112, 212 can be included in the upper and lower flanges 110, 210 for housing and receiving the locating pin 214. In the embodiment shown in FIG. 1, the locating pin 214 is configured in the lower mold flange 210, though it should be understood that the locating pin 214 can also be located within the upper mold flange 110. When the two mold halves are brought into the closed configuration, the locating pin 214 can be actuated to protrude upward into the slot formed by the housing insert 112. Once the locating pin 214 is positioned within the aperture of the upper flange 110, relative movement between the mold halves can be restricted.

The locating pin 214 can be operated manually, or via a programmed actuation. For example, the locating pin 214 can be operated in a manner similar to a solenoid valve, wherein a current is applied in the insert 212 to induce a magnetic field which forces the pin 214 to extend or deploy upwards into the insert 112 of the upper mold.

In accordance with an aspect of the present disclosure, a layer(s) of fiber glass 300 can be positioned between the upper and lower mold halves, and extend laterally outward to be sandwiched between the flanges 110, 210, as shown. In some embodiments the fiberglass layer(s) 300 extends over the locating pin 214, when in the actuated or extended position. In such embodiments, the fiberglass layer 300 can be wedged within the aperture of insert 112. In other embodiments, the fiberglass layer 300 can be configured with an aperture which corresponds in location to the position of the locating pin 214. Upon actuation, the locating pin protrudes through and above the fiberglass layer 300. In yet other embodiments, the fiberglass layer can be a contiguous sheet which is pierced by the locating pin 214 upon actuation of the pin.

While the use of a mechanical position indicating means between the mold halves, such as the exemplary locating pin 214 disclosed herein, adequately registers the mold halves and prevents relative lateral movement, use of such mechanical structures can create gaps and crevices between the mold components. These gaps can lead to undesired flow of resin during fabrication, which can compromise the integrity of the molded product and require excess clean up.

Figure 2:
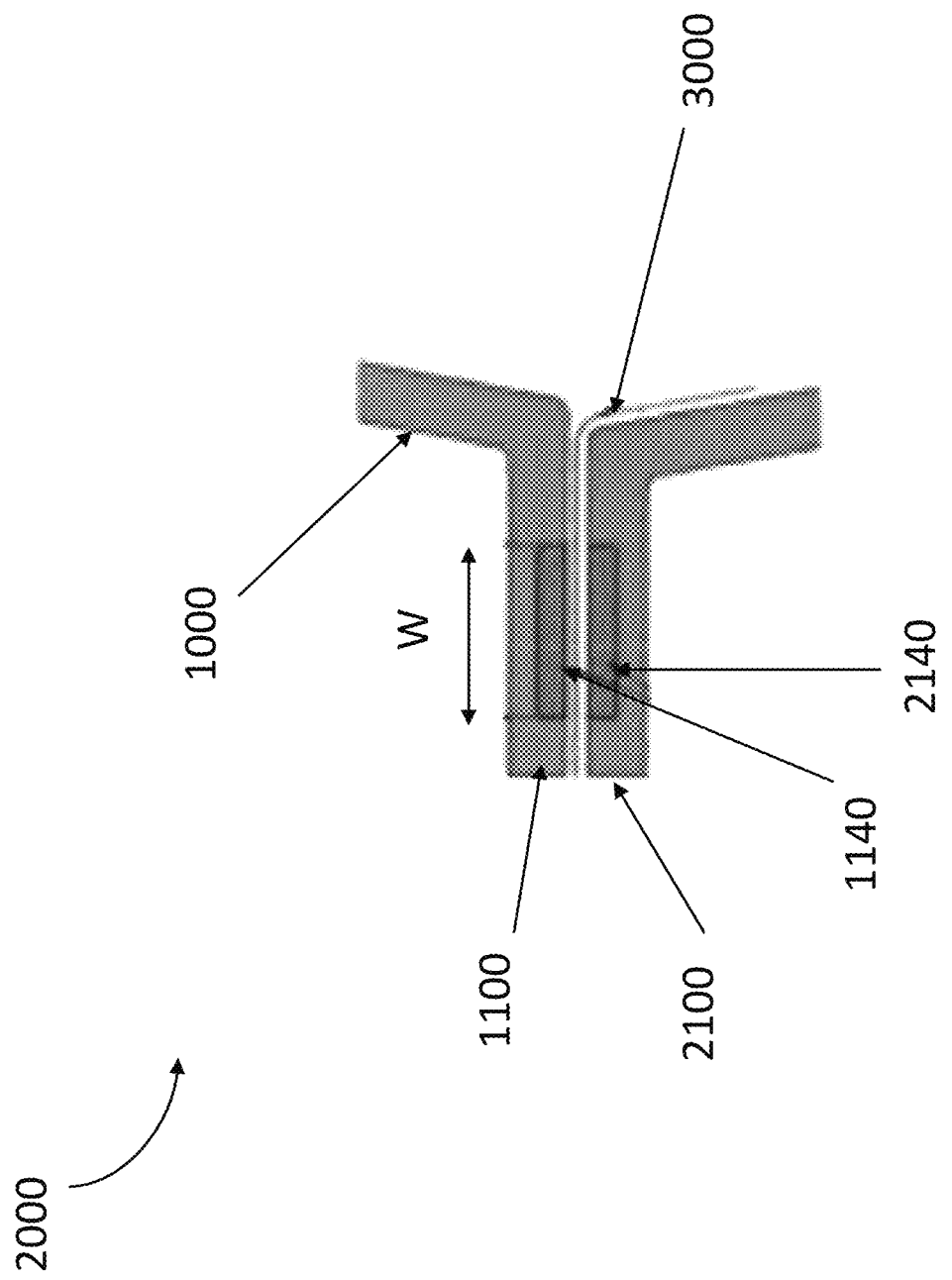
FIG. 2 is a schematic representation of the mold having magnets within the flange portions, in accordance with the disclosed subject matter.
Figure 3:
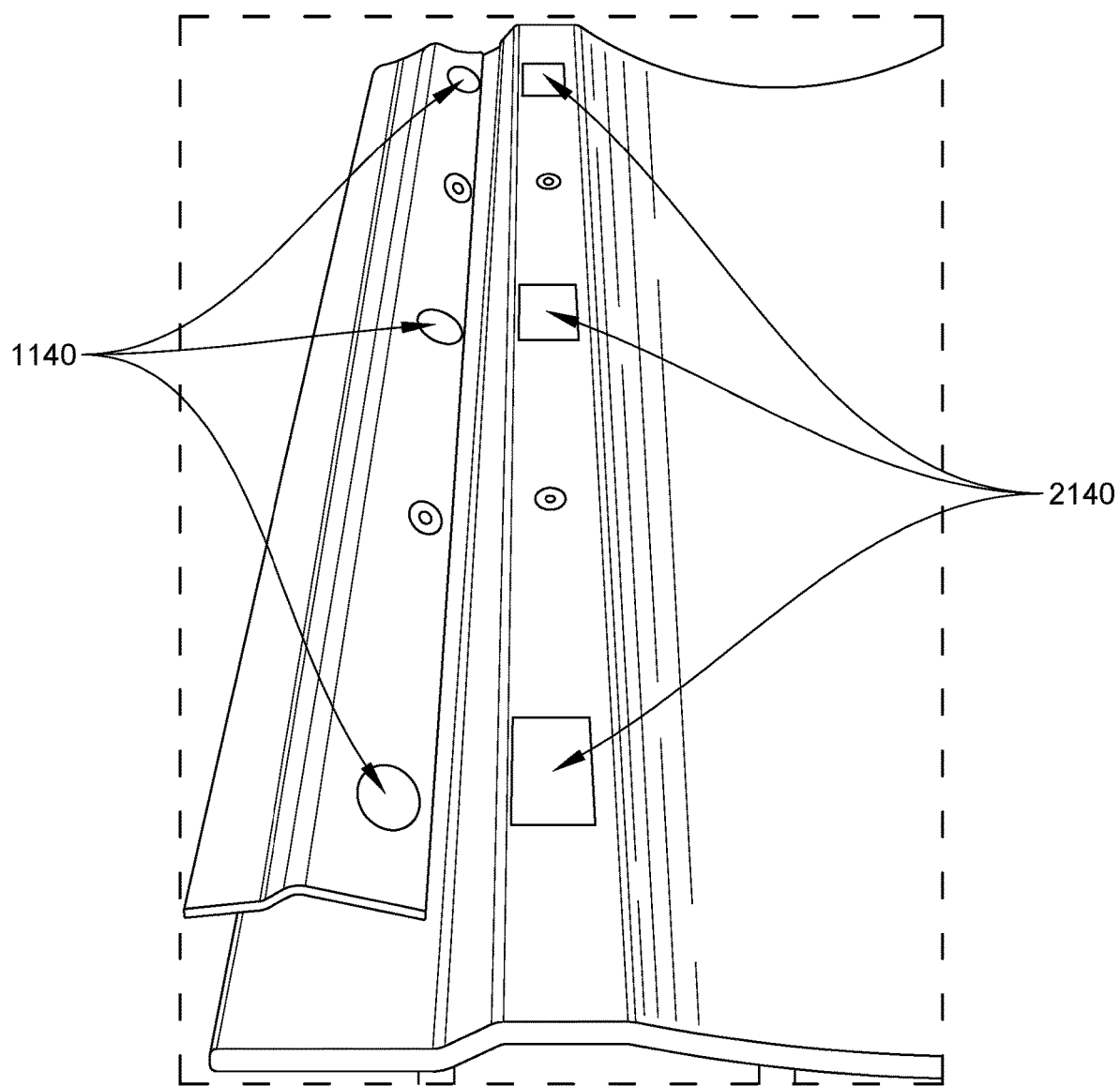
FIG. 3 is a view of the flanges with magnets embedded therein, in accordance with the disclosed subject matter.

Thus, in accordance with another aspect of the disclosure, the position indicating means can be configured as a magnetic bond between the mold components. In the exemplary embodiment shown in FIGS. 2-3, a magnet 1140 is included within the flange 1100 of the upper mold and a magnetically conductive element 1140 is positioned within the flange 2100 of the lower mold. Additionally or alternatively, the magnetically conductive element 1140 can be configured as a magnet. In some embodiments, the magnet(s) 1140, 2140 can be configured as rare-earth magnets which are disposed or embedded within openings within the flanges. In other embodiments, the magnetic force can be provided as an electromagnet(s) which can be turned on/off to cycle the magnetic force as desired. For exemplary purposes only, some representative rare-earth magnets suitable for use in the disclosed system and method exhibit a magnetic force of approximately 50-150 lbs. In some embodiments, the magnetic coupling can be overcome or severed by application of a manual pull force.

The magnet(s) can be configured as a single element extending along the desired length of the flange, or can comprise a plurality of discrete magnets spaced according to a predetermined layout. For example, the density/frequency of the magnets can increase proximate the root portion of the blade, if so desired. In some embodiments, the magnets are uniformly spaced along the flange length. In the exemplary embodiment shown in FIG. 2, the magnets 1140, 2140 have a width "W" greater than at least half the width of the flanges 1100, 2100. Additionally, the magnets have a thickness of approximately 3 mm. In some embodiments, the opening within the flanges 1100, 2100 is formed as a recess (rather than a complete aperture) with a depth in the flange which extends a distance less than the thickness of the first flange surface. In some embodiments, the outer surface (i.e. upper surface of the magnet 2140; lower surface of magnet 1140) is in-plane with surface of the respective flange portion 2100, 1100.

Thus, the magnetic attachment or coupling of the flanges provides a contiguous surface of the mold which is substantially free of crevices or gaps. This uniform and continuous structure minimizes the surface area which the resin is exposed to, and prevents undesired leakage or creep of resin into crevices/gaps that are associated with mechanical coupling mechanisms. Moreover, the substantially planar surface of the magnetically coupled flanges reduces the likelihood of damage (e.g. tearing, piercing) of the layer of composite material 300 between the flanges, which is common in mechanically coupled flanges.

Accordingly, the magnetically coupled flanges system disclosed herein provides for a method of manufacturing a wind turbine blade comprising fiber reinforced polymer material including: a) providing a first mold part having a first forming surface with a contour that defines at least a part of an outer surface of the wind turbine blade, b) arranging fiber material in the first mold part, c) magnetically coupling the flanges of the mold, d) introducing a resin into the mold, wherein the resin and fiber material is retained against the forming surfaces, and e) curing the resin in order to form the wind turbine blade.

In operation, the mold can be opened and closed by imparting relative movement between lower mold 100 and upper mold 200. In other words, the lower mold 100 can be fixed and the upper mold 200 removeable, or the lower mold 100 can be removeable while the upper mold 200 remains fixed. Additionally, or alternatively, both the lower mold 100 and upper mold 200 can be moved simultaneously. Further, the flanges 1100, 2100 can be configured to have an equivalent width and length.

In some embodiments, the flange 110 of the lower upper mold, or at least portions thereof, is brought into direct contact with the flange 210 of the lower mold. Such configurations can enhance the sealing bond between the mold halves, thereby inhibiting or preventing resin leakage and reducing cycle time.

Figure 4:
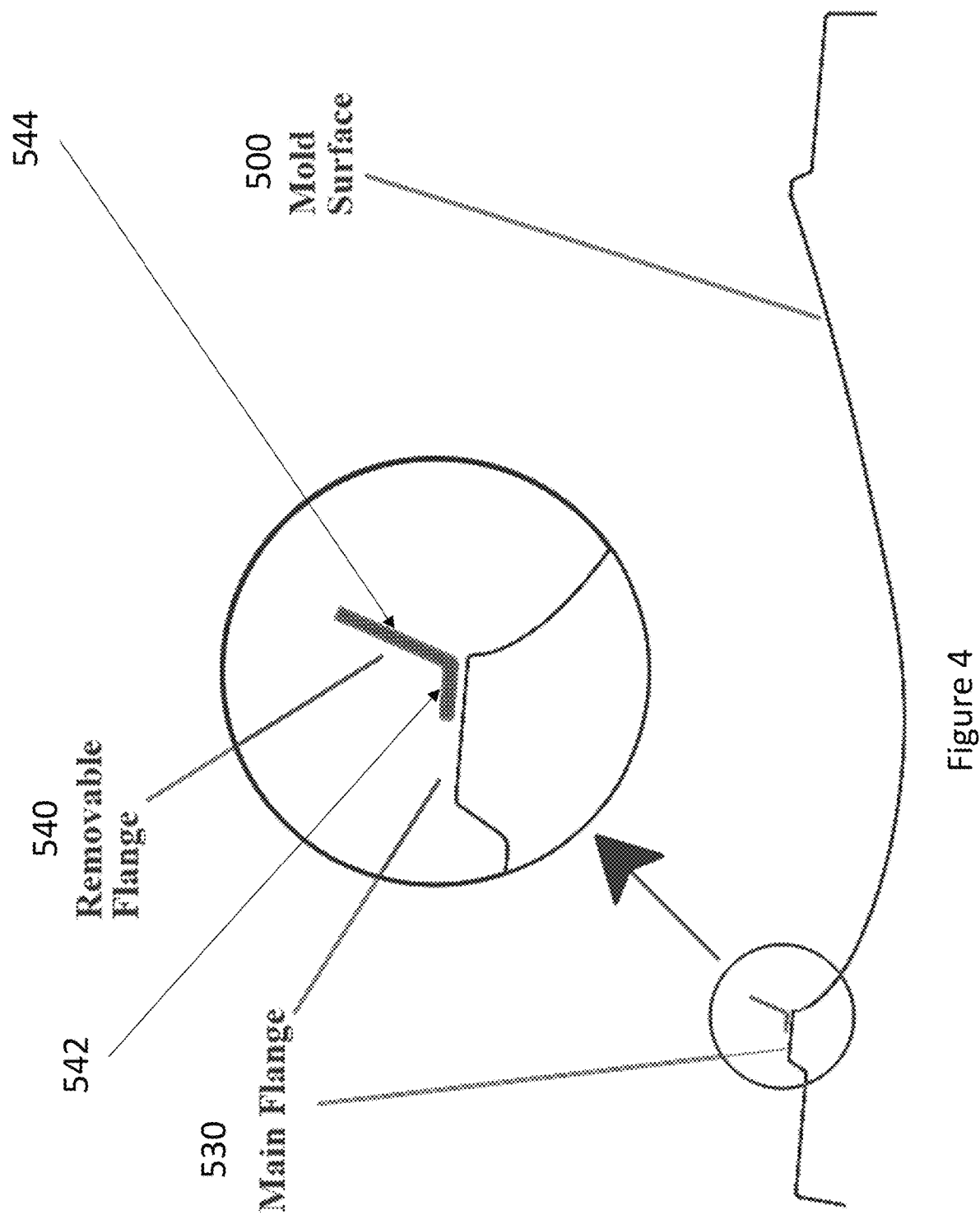
FIG. 4 is a schematic cross-sectional view of mold with a removable flange, in accordance with the disclosed subject matter.
Figure 5:
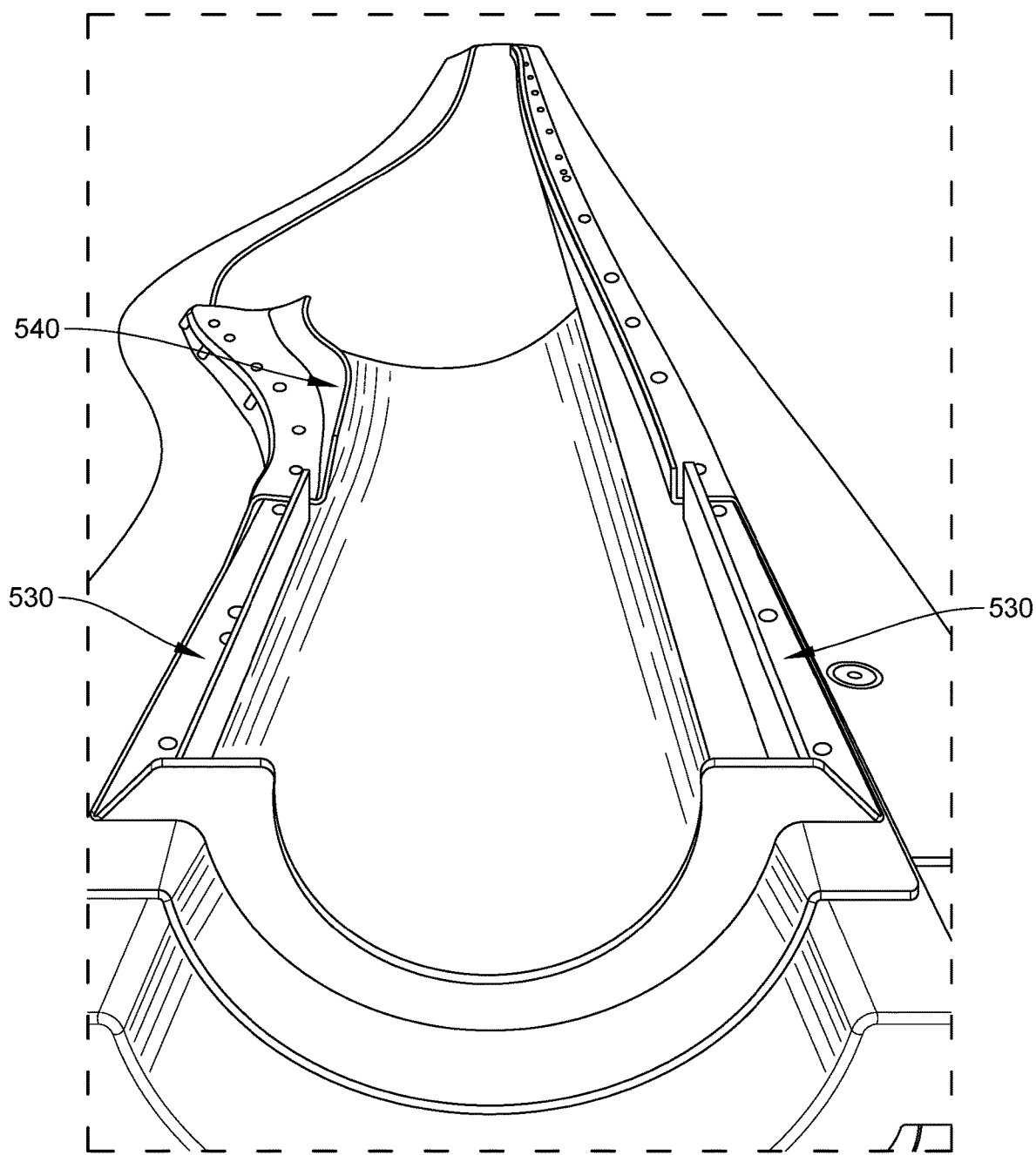
FIG. 5 is a schematic view of mold with a removable flange, in accordance with the disclosed subject matter.

In accordance with another aspect of the disclosure, the magnetic flange(s) can be removably attached to the main molds which form the upper (i.e. suction side) and lower (i.e. pressure side) of the wind turbine blades. As shown in FIG. 4, a lower mold half (e.g. pressure side of blade) is provided having mold surface 500 which forms the skin of the blade (a complimentary second mold half for forming the suction side of the blade is also provided which is closed upon the lower mold, with resin thereafter drawn throughout the fiber layup segments). Each mold half includes a main flange (e.g. 530) which is a permanent part of the mold, as shown in FIG. 5. As shown in greater detail in the zoom-in callout of FIG. 4, the lower mold has a substantially planar flange 530 which is configured to operate in tandem with removable flange 540. The removable flange 540 (and/or main flange 530) containing the embedded magnets, as described above. The magnet(s) can be incorporated into the laterally extending portion 542 of the removable flange, with corresponding magnetically conductive material within the main flange 530 such that the two magnetic features are aligned upon closure of the molds.

In some embodiments, the main flange 530 can extend a distance greater than the generally laterally extending portion 542 of removable flange 540, as shown in FIG. 4. Additionally, the upwardly extending portion 544 can be formed at an angle other than 90°, e.g. approximately 105° relative to lateral portion 542, as shown. In such embodiments, the flange portion 544 facilitates the formation of a bonding flange of the turbine blade, which has a complimentary flange formed on the other blade half, with these two formed flanges being brought into engagement upon closure of the two mold halves to provide final bonding and blade assembly.

In operation, the removable flange 540 is brought into engagement with main flange 530 while the composite structure is formed within the mold with the desired fiber (e.g. glass, carbon, etc.) and resin. Once formed, the removable flange 540 is removed, leaving the formed flange unobstructed and configured for engagement with the complimentary flange formed in the other mold half.

In some embodiments, the removable flanges form a geometry that causes the molded part to be trapped in the mold. Accordingly, the flanges must be removed in order to remove the part from the mold. For removal, the operator can manually lift the flange off 540 of the locating pins. In such embodiments, the force of the magnet must be strong enough to hold the flanges in place during molding but weak enough for the operator to overcome this magnetic force by hand. Additionally or alternatively, in some instances, wedges may be used to initially break the flange free 540 free from the underlying main flange 530.

In accordance with the present disclosure, a plurality of removable flanges can be incorporated on both the upper (blade suction side) mold and lower (blade pressure side)

mold to form complimentary flanges which are bonded together for form the final blade assembly.

The present disclosure is applicable to both manual resin supply, resin transfer molding (RTM), vacuum assisted resin transfer molding (VARTM), and for the production of non-hollow and hollow molds.

For purpose of illustration and not limitation, the present disclosure depicts the operation of the system and method herein for the manufacturing a wind turbine blade components, though it is to be understood that the present disclosure is equally applicable to other large composite structures.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A mold for forming a wind turbine blade having a leading edge and a trailing edge comprising:
    a first mold surface, the first mold surface including a first flange portion having an opening therein;
    a second mold surface, the second mold surface including a second flange portion having an opening formed therein;
    wherein the first and second mold surfaces are configured for relative movement therebetween from an open position to a closed position;
    a removable flange having a laterally extending portion and an upwardly extending portion defining an angle therebetween,
    the laterally extending portion having an opening formed therein, and disposed adjacent to the first flange portion of the first mold surface, with the laterally extending portion of the removable flange extending a distance less than the first flange portion of the first mold surface, and an apex of the angle between the laterally extending portion and upwardly extending portion disposed at the leading edge,
    the upwardly extending portion having a first end and a second end, the first end disposed at the leading edge and the second end spaced from the leading edge;
    wherein the opening of the first flange portion is aligned with the opening of the laterally extending portion of the removable flange; and
    a first magnet disposed within the opening in the first flange portion; and
    a second magnet disposed within the opening of the laterally extending portion of the removable flange; and
    a third magnet disposed within the opening of the second flange portion.

2. The mold of claim 1, wherein the first and second magnets are rare-earth magnets.

3. The mold of claim 1, wherein the first magnet has a width greater than at least half the width of the first flange portion.

4. The mold of claim 1, wherein the second magnet has a width greater than at least half the width of the laterally extending portion of the removable flange.

5. The mold of claim 1, wherein at least one magnet has a thickness of approximately 3 mm.

6. The mold of claim 1, wherein a depth of the opening in the first flange portion extends a distance less than the thickness of the first flange portion.

7. The mold of claim 1, wherein a depth of the opening in the laterally extending portion of the removable flange extends a distance less than the thickness of the laterally extending portion of the removable flange.

8. The mold of claim 1, wherein an upper surface of the first magnet is in-plane with an upper surface of the first flange portion.

9. The mold of claim 1, wherein an upper surface of the second magnet is in-plane with an upper surface of the laterally extending portion of the removable flange.

10. The mold of claim 1, wherein at least one lamina of a composite material is disposed between the first flange portion and the the second flange portion when the mold is in a closed position.

11. The mold of claim 1, wherein the first flange portion and second flange portion have an equivalent width.

* * * * *